United States Patent [19]

Hefele

[11] 3,956,213

[45] May 11, 1976

[54] SUSPENSION AGENT FOR SYNTHETIC PLASTICS POWDER

[75] Inventor: Josef Hefele, Grafelfing, Germany

[73] Assignee: Kufner Textilwerke KG., Munich, Germany

[22] Filed: May 9, 1973

[21] Appl. No.: 358,777

[30] Foreign Application Priority Data
June 15, 1972   Germany............................ 2229308

[52] U.S. Cl.............................. 260/23 R; 106/171; 260/23 TN; 260/23 H
[51] Int. Cl.²......................................... C08L 91/00
[58] Field of Search............. 260/28 R, 23 E, 23 M, 260/29.6, 23 H, 23 TN; 106/171

[56] References Cited
UNITED STATES PATENTS

| | | | |
|---|---|---|---|
| 1,830,980 | 11/1931 | Carr | 260/23 R |
| 2,184,288 | 12/1939 | Dangelmajer | 260/23 R |
| 2,889,308 | 6/1959 | Fedderson | 260/17 A |
| 3,346,520 | 10/1967 | Lee | 260/17 A |

OTHER PUBLICATIONS

Schildknecht, Polymer Processes, Interscience Publishers, Inc., 1956, pp. 78, 80, 81, 89.

Primary Examiner—Lewis T. Jacobs
Attorney, Agent, or Firm—Ladas, Parry, Von Gehr, Goldsmith & Deschamps

[57] ABSTRACT

Suspension agent for synthetic plastics powders for spotwise coating of interlinings for articles of clothing, comprising an aqueous solution of the salt of a polymeric organic acid in a concentration of 0.05 to 3% by weight, and additionally containing in extremely fine dispersion of a member selected from the group of 4 to 15% by weight of an unsubstituted fatty acid and 0.05 to 15% by weight of a hydroxy substituted fatty acid.

10 Claims, No Drawings

SUSPENSION AGENT FOR SYNTHETIC PLASTICS POWDER

FIELD OF THE INVENTION

The invention relates to a suspension agent for synthetic plastics powder suitable for the application in the form of spots to interlinings for articles of clothing.

Suitable synthetic compositions having a granulation of below 150 $\mu$ may by simple stirring easily be homogeneously distributed in this medium. The resultant pastes, even if softeners are added, can be fed entirely without problems to a printing machine over long hours of working, for application via printing rollers with screenwise disposed perforations onto sheetlike materials such as woven or knitted structures, fleeces and foam materials which are preferably used as punctiformly or spotwise screen-coated interlinings for articles of clothing.

A number of technical advantages can be achieved with the suspension agent according to the invention, both in the coating and in the subsequent processing of the coated sheet material.

SUMMARY OF THE INVENTION

The suspension agent according to the invention, for synthetic plastics powder for coating in the form of spots of interlinings for garments is characterised in that it consists of an aqueous solution of the salt of a polymeric organic acid in a concentration of 0.05 to 3% by weight, and in that it also contains in extremely fine distribution 4 to 15% by weight of a non-substituted fatty acid or 0.05 to 15% by weight of a hydroxy substituted fatty acid.

Particularly favourable results are obtained with the substituted or non-substituted fatty acids, particularly with quantitative proportions above 4.1% by wieght, proportions above 4.5% by weight being preferred.

Suitable synthetic plastics compositions such as polyvinyl-acetate and the copolymers thereof, e.g. ethylene-vinylacetate copolymers, and also non-crosslinking thermoplastic polyurethanes and polyamides, particularly ternary and quaternary copolyamides which have been produced by copolymerisation or condensation from 6-caprolactam, 12-laurinlactam, 1, 6-hexamethylenediamine, isophorondiamine, azelaic acid, sebazic acid, adipic acid, 7-amino-enanthic acid and 11-aminoundecenoic acid, or polyethylenes, particularly low-pressure polyethylene, possibly with further additions of ammonia emulsifiers and softeners up to high percentages, in a proportion by weight of synthtic plastics powder of approximately 35 to 40%, can be very easily and completely homogeneously stirred into the suspension agent of the invention, resulting in the formation of freely flowing and non-coagulating and non-sedimenting printing pastes which cause no trouble during the printing process.

Apart from saturated fatty acids, e.g. stearic acid and palmitic acid, unsaturated fatty acids, e.g. oleic acid, and those in which one or more H-atoms of the corresponding saturated or unsaturated acids are substituted by hydroxy, groups, may also be used, mostly in mixture with saturated fatty acids.

By suitable choice of the inter se combinable saturated, unsaturated or hydroxy-substituted fatty acids, the synthetic plastics used may be matched to optimum advantage as regards phase compatibility, adhesion, melting point and melting viscosity, as well as resistance to steam, water and chemical cleaning and hydrophobic effect.

Where particularly rapidly gelling softeners are added, it is advantageous to blend the synthetic plastics powder and softener with the dispersing agent in separate batches, to which small quantities of ammonia may be added, the two batches then being blended together in a high-speed mixer.

Such a procedure is for example expedient when mixing 6, 6/6, 12-copolyamides which are copolymerised and condensed from about one-third part by weight caprolactam, one-third part by weight laurinlactam and one-third part by weight AH salt (i.e. the hexamethylene diamine salt of adipic acid), with toluenesulphonanic acid-ethylamide as the softener.

Suitable salts of polymeric organic acid are those which, dissolved in water, produce a marked rise in viscosity even at minimal concentration. Particularly suitable are the ammonium salts of homo— or copolymeric acrylic acids and/or methacrylic acids, which are marketed by the manufacturing companies already as viscous solutions or — in the case of their free acids — as a dispersion. In the latter case, the free acid dissolves to form an ammonium salt when ammonia is added.

Apart from ammonium salts, also other water-soluble salts such as alkali salts and salts with primary, secondary or tertiary amines, for example salts with monoethanol amine, diethanolamine, triethanolamine or morpholin may be used. In the case of the free acids being used, the salts can be readily brought into solution by the addition of alkali or amine.

Finally, instead of the salts of the homo- or copolymeric acrylic or methacrylic acids, also salts with other polymeric acids, e.g. salts with carboxymethyl cellulose or with polymeric styrene-maleic acid may be used, which are preferably likewise usable as an ammonium salt, but also as other water-soluble salts.

The incorporation and fine dispersion of the fatty acids, such as for example stearic, palmitic or hydroxystearic acid — is effected simply in that the solution of the salt of the polymeric organic acid is heated together with the fatty acid, possibly with the further addition of some ammonia, to above the melting point of the fatty acid, heating being accompanied by mechanical movement. The most convenient method is to introduce steam directly in order to achieve this. During cooling, accompanied by movement, the fatty acid recrystallises in extremely fine dispersion. The suspension agent has a milky-white appearance.

ADVANTAGES OF THE INVENTION

The suspension agent according to the invention has a number of advantages.

Compared with conventional suspension agents, the advantages are in particular:

a. with virtually apolar synthetic plastics - e.g. high and low-pressure polyethylene, and among these, polar synthetic plastics with a comparatively low proportion of polar groups, e.g. ternary copolyamides with a relatively high proportion of a low-polar polymerisation component, such as for example the monomer component 12-laurinlactam. By virtue of their being more related in character to the fatty acids, such synthetic plastics can absorb larger quantities of such fatty acids without phase separation and without brittle fractures in the dried plastics composition.

The proportions of fatty acids reduce the melting viscosity of such synthetic plastics and enhance their adhesion to water-repellent-treated top materials, such as for example silicone or poplins impregnated with the material known under the trade mark "Scotchgard" — without the water resistance or resistance to chemical cleaning suffering and without the melting range being excessively lowered. This latter feature is significant with regard to the pressing of garments during make-up, where rapid working with inadequate vacuum extraction can result in reactivation of the sealing effect and a loosening of the adhesive bond if the melting range is lowered excessively.

b. with large additions of rapidly gelling softeners to more polar-constructed synthetic plastics compositions — e.g. 6, 6/6, 12-copolyamides with a mean proportion of 12-laurinlactam. Here a relatively high proportion of fatty acids facilitates coagulate-free incorporation of the softener. Such softener-rich suspended copolyamides are particularly suitable for producing interlinings with cleaning resistant hot-sealing coatings of which very mild sealing conditions are required — such as for example interlinings for natural and synthetic fur and leather. In this case, it may also be expedient to increase the proportion of the salt of polymeric acids in the suspension agent.

c. when sealing the interlinings onto top materials and when pressing the garments with the iron and during steam-pressing. The proportion of fatty acids reduces the risk of the hot seal adhesive permeating through the interlining and through the top material and the troublesome adhesion of the lining material to the interlining which occasionally happens during pressing is completely eliminated.

d. during stamping-out and cutting of the interlinings. Here, the stamping-out knife can leave dirty marks and the interlinings stacked with the coated sides in contact may stick together. These sources of trouble are completely eliminated by the indicated quantities of fatty acids.

EXAMPLES

The invention will be explained in detail hereinafter with reference to Examples which imply no limitation.

EXAMPLE 1

14 parts by weight of a 10% solution of a morpholin salt of a polymeric acrylic acid are mixed with 86 parts by weight of water, 6 parts by wieght of 12-hydroxystearic acid and 0.2 parts by weight of 25% ammonia are added to 36 parts by weight of this aqueous solution. The mixture is heated to over 90°C by the direct introduction of steam, the intermixed oxystearic acid becoming melted and emulsified. By condensing the vapour, the weight increase of the emulsion amounts approximately to a further 5.8 parts by weight.

The hot emulsion is then stirred into 38 parts by weight of the above clear dilute solution of the morpholin salt of the polymeric acid.

After it has cooled and been stirred again, this preparation constitutes a suspension agent for polyamide powder.

64 parts by weight of the suspension agent are blended with 36 parts by weight of a ternary copolyamide ground to less than 100 $\mu$ granulation, which has been produced from approximately 25 parts by weight caprolactam, 25 parts by weight hexamthylene diamine salt of adipic acid and 50 parts by weight laurinlactam in the presence of chainbreakers, melted on a Kofler heater at approximately 125°C and having a melting viscosity of approx. 3,000 poises at approx. 160°C. Then 3.6 parts by weight of benzene-sulphonic acid-N-butylamide are stirred in as a softener. The homogeneously stirred paste is immediately ready for use and can without difficulty be printed on to interlinings by a screen process.

The dried-on-non-agglomerated paste melts on the Kofler heater at approximately 115°C. It has a melting viscosity of 800 poises at 160°C. The cooled molten composition is similar to hard rubber and has a viscous-elastic consistency. No brittle fracture can be found.

The imprinted interlinings can be hot-sealed onto top materials under comparatively mild conditions from approximately 130°C on. The adhesive bond is characterised by resistance to boiling and washing. After the first chemical cleaning, the adhesive strength has risen by approximately 20%.

EXAMPLE 2

14 parts by weight of a 10% commercial-quality ammonium salt solution of a polymeric acrylic acid are blended with 86 parts by weight of water and to 36 parts by weight of this diluted solution, 6 parts by weight of stearic acid and 0.2 parts by weight 25% ammonia are added. By direct introduction of steam, the mixture is heated to above 65°C, the intermixed stearic acid becoming melted and emulsified.

Condensation of the steam results in a weight increase of the emulsion of approximately a further 5.8 parts by weight. Then the heated emulsion is stirred into 3.8 parts by weight of the above cold and dilute solution of ammonium salt of polymeric acid. This preparation, after it has cooled and been stirred again constitutes the suspending medium for polyamide powder.

45 parts by weight of the suspending medium are blended with 30 parts by weight of a ternary copolyamide which has been produced from approximately 34 parts by weight caprolactam, 33 parts by weight AH salt and 33 parts by weight laurinlactam in the presence of chainbreakers, and ground to less than 100 $\mu$ granulation, heated on a Kofler heater at approx. 120°C and possessing a melting viscosity of approximately 6,000 poises at 160°C. Then, using a high-speed agitator, an emulsion consisting of 27 parts by weight of the suspension agent and 27 parts by weight of toluene-sulphonic acid ethylamide is stirred in slowly. The homogeneously stirred paste is immediately ready for use and can be applied onto interlinings through a screen, without trouble. The dried-on non-agglomerated paste melts on the Kofler heater at approximately 70°C. The cooled melting composition is similar to soft rubber.

The interlining can be hot-sealed onto fur and leather under particularly mild temperature conditions with effect from approximately 80°C. The sealed bond is resistant to cleaning by water and chemicals. After the first chemical cleaning, the adhesive strength has risen by approximately 50%.

EXAMPLE 3

20.5 parts by weight of water at 85°C are mixed with 2 parts by weight of a 10% commercial-quality solution of an ammonium salt of a polymeric acrylic acid, 0.5 parts by weight 25% ammonia and 7.5 parts by weight stearic acid. The intermixed stearic acid melts thereby and is emulsified into a paste by stirring.

22.5 parts by weight of this mixture are blended with 52.5% water and 0.75 parts by weight of emulsifier on the basis of an hydroxyethylating product to form the actual suspending medium.

45 parts by weight of low-pressure polyethylene with a melting point of 134°C and a melting viscosity of 10,000 poises at 160°C are stirred into this suspending medium.

The homogeneously stirred flowable paste can be used immediately and can be printed without trouble onto shirt collar interlinings. The dried-on paste melts on the Kofler heater at around 133°C and has a melting viscosity of 5,000 poises at 160°C.

The shirt collar interlinings which are normally printed on an ultra-fine screen (smaller than 20 mesh) can be processed under normal sealing conditions at approximately 170°C to produce finished interlinings which are resistant to boiling and ironing.

What is claimed is:

1. Suspension agent for synthetic plastics powders for spotwise coating of interlings for articles of clothing, comprising an aqueous solution of the salt of a polymeric organic acid in a concentration of 0.05 to 3% by weight, and additionally containing in extremely fine dispersion of a member selected from the group of 4 to 15% by weight of an unsubstituted fatty acid and 0.05 to 15% by weight of a hydroxy substituted fatty acid.

2. Suspension agent according to claim 1 wherein said salt of a polymeric organic acid is a salt of carboxymethyl cellulose and/or polymeric styrene-maleic acid.

3. Suspension agent as claimed in claim 1 wherein said dispersion is of a recrystallised fatty acid.

4. Suspension agent as claimed in claim 1 wherein said dispersion comprises as the fatty acid component of unsaturated fatty acid in combination with a recrystallised saturated fatty acid.

5. Suspension agent as claimed in claim 1 containing a hydroxystearic acid.

6. A composition comprising a suspension agent as claimed in claim 1 together with up to 40% by weight of a plastics material selected from the group consisting of polyvinyl acetate polymer, ethylene-vinyl acetate copolymer, non-cross linking polyurethanes and polyamides, and polyethylene.

7. Suspension agent as claimed in claim 1 containing as said fatty acid a mixture of oleic acid and at least one member the group consisting of stearic acid and palmitic acid.

8. An aqueous composition comprising about 35 to 40% of a polyamide powder together with a suspension agent as claimed in claim 1 and a plasticiser.

9. In a process for the dispersion of synthetic plastics compositions selected from the group comprising polyvinyl acetate and copolymers thereof, thermoplastic polyurethanes and polyamides and polyethylene of particle size below 150$\mu$ in an aqueous medium, the improvement which consists in employing as the suspension agent a salt of a polymeric organic acid in a concentration of from 0.05 to 3% by weight together with an extremely fine dispersion of a member selected from the group of 4 to 15% by weight of an unsubstituted fatty acid and 0.05 to 15% by weight of a hydroxy substituted fatty acid.

10. A suspension agent as claimed in claim 1 wherein said salt of a polymeric organic acid is an ammonium salt.

* * * * *